United States Patent [19]

Inai et al.

[11] Patent Number: 5,178,958
[45] Date of Patent: Jan. 12, 1993

[54] UNDERCOAT COMPOSITION

[75] Inventors: Toshimi Inai; Naofumi Imahigashi; Koichi Karukaya, all of Takatsuki; Koji Motoi, Kyoto, all of Japan

[73] Assignee: Sekisui Kagaku Kogyo Kabushiki Kaisha, Osaka, Japan

[21] Appl. No.: 595,803

[22] Filed: Oct. 11, 1990

Related U.S. Application Data

[63] Continuation of Ser. No. 254,337, Oct. 6, 1988, abandoned.

[51] Int. Cl.$^5$ .............................................. B32B 15/08
[52] U.S. Cl. .................................... 428/458; 428/463; 428/474.7; 428/474.9; 428/476.3
[58] Field of Search ................... 525/537, 421, 422; 528/192; 428/457, 458, 463, 474.7, 476.3, 474.9

[56] References Cited

U.S. PATENT DOCUMENTS 3,845,018 10/1974 Bilow et al. ..................... 528/192
4,396,658 8/1983 Mettes et al. ...................... 525/537

FOREIGN PATENT DOCUMENTS 3191858 8/1988 Japan .................................. 525/537

Primary Examiner—Thomas J. Herbert, Jr.
Attorney, Agent, or Firm—Morrison & Foerster

[57] ABSTRACT

An undercoat composition for a powder coating of a heat-resistant resin on a metal substrate at a high coating temperature wherein the composition includes a specific imide prepolymer.

12 Claims, No Drawings

UNDERCOAT COMPOSITION

This application is a continuation of application Ser. No. 07/254,337 filed, Oct. 6, 1988, now abandoned.

BACKGROUND OF THE INVENTION

1. Field of the Invention

This invention relates to an undercoat composition for a powder coating of a heat-resistant resin on a metal substrate at a high coating temperature, in particular, it relates to an undercoat composition with excellent heat-resistance and excellent adhesiveness to both the upper resin layer and the metal substrate.

2. Description of the Prior Art

Various resins are coated on a metal substrate to improve the corrosion resistance of the metal. In this case, an undercoat composition is used for example, for prevention of dry corrosion of the metal and for improvement of adhesiveness between the metal and the upper resin layer.

Mainly, the undercoat composition must have excellent adhesion to both the metal and the resin.

Such an undercoat composition includes specific organic compounds such as epoxy resins, phenol resins, aminobismaleimides, etc. Although these organic compounds are heat-stable up to a certain temperature, the compounds show propensity to decompose on being kept at the temperature of 300° C. or more. Accordingly, a resin with a high melting point cannot be powder-coated on the undercoat layer made of these compounds at a high coating temperature (300° C. or more). For example, the melting points of tetrafluoroethylene-hexafluoropropylene copolymer (FEP) and perfluoroalkoxy resin (PFA) are 275° C. and 310° C., respectively. Thus, these resins must be heated at a higher temperature than their melting points when they are powder-coated on the undercoat layer. In this case, the organic compounds mentioned above that are contained in the undercoat layer decompose at such high temperatures. Therefore, the adhesiveness between the metal and the coating resin becomes inferior, or it is impossible to achieve powder coating because evolution of a gas from the decomposed compound brings about the foaming of the coated resin.

To solve this problem, the use of inorganic binders as the undercoat composition instead of these organic compounds is proposed. Inorganic binders for the coating of fluorocarbon resins on a metal substrate include, for example, fluorocarbon resins, chelate compounds of Group IV transition metals, and water-insoluble fine powdered refractories (disclosed in Japanese Patent Publication No. 55-39188); or fluorocarbon resins, phosphoric acid, inorganic peroxides, and oxo acids (disclosed in Japanese Patents Publication No. 57-8836). As an undercoat composition to coat polyphenylenesulfide resins on a metal substrate, a composition is known that includes a combination of metal powder consisting of aluminium powder and zinc powder, and silicate compounds such as colloidal silica, alkyl silicate, etc. (disclosed in Japanese Laid-Open Patent Publication No. 53-25649).

However, these inorganic binders, which have excellent heat-resistance, do not have sufficient adhesiveness to both the metal substrate and the upper resin layer. Thus, when the resulting coated metal substrate comes into contact with hot water, the coating layer blisters or peels.

SUMMARY OF THE INVENTION

The undercoat composition of this invention for coating a resin on a metal substrate, which overcomes the above-discussed and numerous other disadvantages and deficiencies of the prior art, comprises said resin and the imide prepolymer shown in the following formula:

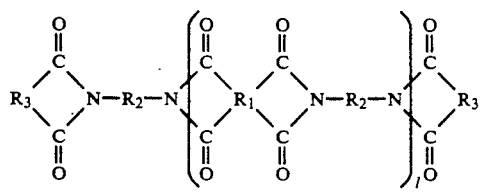

wherein
R1 is an aromatic tetracarboxylic acid residue;
R2 is an aromatic diamine residue;
R3 is an unsaturated acid anhydride residue; and
l is any integer with the proviso that the mean l value is 0 to 5.
the imide groups can include amic acid residues.

In a preferred embodiment, the resin is a crystalline resin and/or an amorphous linear polymer and the undercoat composition including the said resin is coated on a metal substrate at a temperature of 300° C. or more.

In a preferred embodiment, the crystalline resin is at least one selected from the group consisting of tetrafluoroethylene-hexafluoropropylene copolymer (FEP), perfluoroalkoxy resin (PFA), polyphenylenesulfide (PPS), ethylene-tetrafluoroethylene copolymer (ETFE), polyetheretherketone (PEEK), polyetherketone (PEK), nylon (Ny), polyethersulfone (PES), polysulfone (PSF), polyarylate (PAR), and polyetherimide (PEI).

In a preferred embodiment, the undercoat composition further incorporates an inorganic filler.

Therefore, the invention described herein makes possible the objectives of: providing an undercoat composition with excellent heat-resistance and excellent adhesiveness to both the upper resin layer and the metal substrate; providing an undercoat composition that does not decompose when powder coating is accomplished at a high temperature; and providing an undercoat composition that does not cause cracks in the upper resin layer of the resulting coated metal substrate.

DESCRIPTION OF THE PREFERRED EMBODIMENTS

An imide prepolymer including in an undercoat composition of this invention has the following formula:

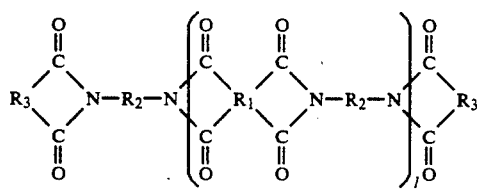

wherein
R1 is an aromatic tetracarboxylic acid residue;
R2 is an aromatic diamine residue;
R3 is an unsatuated acid anhydride residue; and l is any integer with the proviso that the mean l value is 0 to 5.

the imide groups can include amic acid residues.

In the above formula, the aromatic tetracarboxylic acid residue includes, for example, the following:

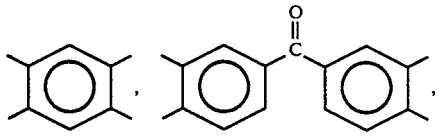

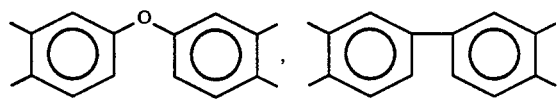

The aromatic diamine residue includes, for example, the following:

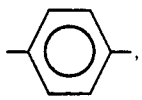

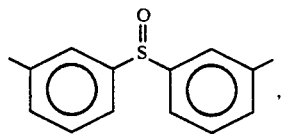

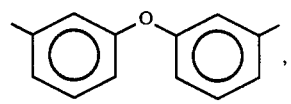

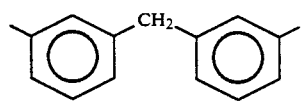

The unsaturated acid anhydride residue includes, for example, the following:

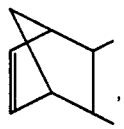

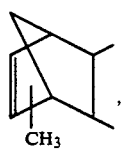

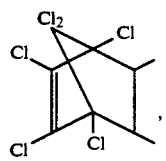

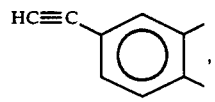

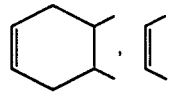

The imide prepolymer can be obtained by the reaction of tetracarboxylic acid, aromatic diamine, and unsaturated acid anhydride.

The aromatic tetracarboxylic acid includes, for example, pyromellitic dianhydride, 3,3',4,4'-benzophenone tetracarboxylic dianhydride, 2,3,6,7-naphthalene tetracarboxylic dianhydride, 3,3',4,4'-diphenyltetracarboxylic dianhydride, 2,2',3,3'-diphenyltetracarboxylic dianhydride, bis(3,4-dicarboxyphenyl)ether dianhydride, bis(3,4-dicarboxyphenyl)methane dianhydride, and bis(3,4-dicarboxyphenyl)sulfone dianhydride.

The aromatic diamine includes, for example, paraphenylenediamine, metaphenylenediamine, 3,3'-diaminodiphenylmethane (i.e., 3,3'-methylenedianiline), 3,3'-oxydianiline, 4,4'-diaminodiphenylmethane, 3,3'-diaminodiphenylsulfide, 4,4'-diaminodiphenylsulfide, 3,3'-diaminodiphenylsulfone, 4,4'-diaminodiphenylsulfone, 3,3'-diaminodiphenylether, 4,4'-diaminodiphenylether, 1,5-diaminonaphthalene, 2,6-diaminonaphthalene, n-xylenediamine, n-tolylenediamine, tolidine base, n-aminobenzylamine, p-aminobenzylamine, 1,3-bis(3-aminophenoxy)benzene, 1,4-bis(4-aminophenoxy)-benzene, 2,2'-bis(4-aminophenoxyphenyl)propane, 4,4'-bis(4-aminophenoxy)diphenyl, etc.

The unsaturated acid anhydride includes, for example, 3,6-endomethylene-1,2,3,6-tetrahydrophthalic anhydride, cis-4-cyclohexene-1,2-dicarboxylic anhydride, maleic anhydride, 4-ethinylphthalic anhydride, the alkyl substituents thereof, and the halogen substituents thereof, etc.

All or some of the imide groups in the imide prepolymer mentioned above can be amic acid residues that are precursors of the imide group.

The resin contained in the composition along with the imide prepolymer mentioned above, is preferably the same kind as the upper resin that is powder-coated on the undercoat layer in order to obtain excellent adhesiveness between the undercoat layer and the upper resin layer. This resin contained in the composition includes a crystalline resin and/or an amorphous linear polymer, and the undercoat composition including the said resin is coated on a metal substrate at a temperature of 300° C. or more, being, for example, tetrafluoroethylene-hexafluoropropylene copolymer (FEP), perfluoroalkoxy resin (PFA), polyphenylenesulfide (PPS), ethylene-tetrafluoroethylene copolymer (ETFE), polyetheretherketone (PEEK), polyetherketone (PEK), nylon (Ny), polyethersulfone (PES), polysulfone (PSF), polyarylate (PAR), or polyetherimide (PEI).

The imide prepolymer is mixed with the resin at proportions of 10:90 to 90:10 by weight. When less than 10 parts by weight of the resin is mixed with more than 90 parts by weight of the imide prepolymer, the adhesiveness between the undercoat layer and the upper resin layer will not be satisfactory. On the other hand, when more than 90 parts by weight of the resin is mixed with less than 10 parts by weight of the imide prepolymer, the adhesiveness between the undercoat composition and the metal substrate will not be satisfactory.

Optionally, the undercoat composition of the present invention contains an inorganic filler. The inorganic filler prevents the undercoat layer from peeling from the substrate or causing cracking. The inorganic filler includes metal, metal oxide, glass, carbon, ceramics, etc. The metal includes, for example, aluminium, zinc, nickel alloy, stainless steel, and iron alloy. The metal oxide includes, for example, $Al_2O_3$, $Fe_2O_3$, $TiO_2$, $ZrO_2$, $Cr_2O_3$, $NiO$, etc. The ceramics include silicon nitride, titanium nitride, etc., and also the compounds that are included in the metal oxides mentioned above. Preferably, the metal, the metal oxide, and the glass are fine powders. The mean particle diameter of these powders is 1 to 100 $\mu$m, preferably 5 to 30 $\mu$m. The inorganic filler is preferably included in the composition so that the proportions of the resin and the inorganic filler are 80:20 to 20:80 by weight. When more than 80 parts by weight of the inorganic filler is added to less than 20 parts by weight of the resin, the adhesiveness of the resin in the undercoat composition to the metal substrate is insufficient, resulting in poor adhesion of the upper resin layer to the substrate via the undercoat layer.

EXAMPLE 1

First, 29.74 g of 3,3'-methylenedianiline, 16.42 g of 3,6-endomethylene-1,2,3,6-tetrahydrophthalic anhydride, and 32.22 g of 3,3',4,4'-benzophenonetetracarboxylic dianhydride were dissolved in a mixture of 100 g of dimethylformamide and 300 g of toluene. The mixture obtained was refluxed for 18 hours, and water generated from the reaction was collected in a Dean-Stark trap. The reaction mixture was cooled to room temperature, and then poured into 2 l of water. The resulting precipitate was filtered, and dried under reduced pressure for one day at 110° C. Then 65 g of imide prepolymer was obtained as an orange powder by grinding the dried precipitate in a mortar with a pestle.

| | |
|---|---|
| Imide prepolymer | 10 g |
| Perfluoroalkoxy resin (mean particle diameter, 30 $\mu$m) | 10 g |
| Aluminium powder (mean particle diameter, 40 $\mu$m or less) | 20 g |
| N-methylpyrrolidone | 20 g |

An undercoat composition was obtained by mixing of the above imide prepolymer, perfluoroalkoxy resin, aluminum powder, and N-methylpyrrolidone until homogeneity.

An iron plate (100 mm × 100 mm × 3 mm) was treated by grit blasting and cleaned by use of a stream of compressed air. After the undercoat composition obtained was coated on this plate with a brush, the plate was dried and baked for 1 hour at the temperature of 200° C., and then for 30 minutes at the temperature of 380° C. The resulting undercoat layer was 20 $\mu$m thick, on the average. An upper resin layer was formed by the powder-coating of perfluoroalkoxy resin (PFA; mean particle diameter, 30 $\mu$m) on the undercoat layer at an electrostatic voltage of 60 kV, and then removal of foam from the resin for 1 hour at the temperature of 340° C. The resin layer was 500 $\mu$m thick, on the average.

The adhesiveness between the PFA upper resin layer and the metal substrate of the resulting coated metal plate was evaluated by the following methods.

(1) Peeling test

The peeling strength of the resin layer of the coated metal plate obtained was measured at room temperature by the coating-film peeling test (90° peeling strength test; JIS K-6555). Results showed that the 90° peeling strength was 2 to 3 kg/cm.

(2) Hot water test

The coated metal plate was immersed into hot water for 100 hours, so that the resin-coating side was kept at 95° C. and the iron-plate side (that was not coated with the resin) was kept at 85° C. The resin layer remained in good condition.

EXAMPLE 2

An undercoat composition was obtained by the procedure of Example 1 except that 15.21 g of cis-4-cyclohexene-1,2-dicarboxylic anhydride was substituted 16.42 g of 3,6-endomethylene-1,2,3,6-tetrahydrophthalic anhydride, and that 30.03 g of 3,3'-oxydianiline was used instead of 29.74 g of 3,3'-methylenedianiline. By use of the general procedure of Example 1, an undercoat layer was formed on an iron plate of this undercoat composition. Next, a resin layer was formed by power-coating of PFA on the undercoat layer by the procedure of Example 1.

The adhesion between the PFA layer and the metal substrate of the coated metal plate obtained was evaluated by the procedures of Example 1. The results of the peeling test showed that the 90° peeling strength was 2 to 3 kg/cm. Moreover, after the hot water test, the resin layer remained in good condition.

EXAMPLE 3

An undercoat composition was obtained by the procedure of Example 1 except that 20 g of the imide prepolymer and 25 g of the N-methylpyrrolidone were used. By use of the general procedure of Example 1, an undercoat layer was formed on an iron plate of this undercoat composition. Next, the resin layer was formed by powder-coating of PFA on the undercoat layer by the procedure of Example 1.

The adhesiveness between the PFA layer and the metal substrate of the coated metal plate obtained was evaluated by the procedure of Example 1. Results of the peeling test showed that the 90° peeling strength was 2 to 3 kg/cm. Moreover, after the hot water test, the resin layer remained in good condition.

EXAMPLE 4

The undercoat composition was obtained by the procedure of Example 1 except that 40 g of SUS 304 powder (mean particle diameter, 40 $\mu$m or less) was used instead of the aluminium powder (mean particle diameter, 40 $\mu$m or less). By use of the general procedure of Example 1, an undercoat layer was formed on an iron plate with this undercoat composition. Next, the resin layer was formed by powder-coating of PFA on the undercoat layer by the procedure of Example 1.

The adhesion between the PFA layer and the metal substrate of the resulting coated metal plate was evaluated by to the procedures of Example 1. Results of the peeling test showed that the 90° peeling strength was 2 to 3 kg/cm. Moreover, after the hot water test, the resin layer remained in good condition.

EXAMPLE 5

| | |
|---|---|
| Imide prepolymer of Example 1 | 10 g |
| Polyphenylenesulfide resin (mean particle diameter, 30 μm) | 15 g |
| Aluminium powder (mean particle diameter, 40 μm or less) | 30 g |
| N-Methylpyrrolidone | 15 g |

An undercoat composition was obtained by the mixture of the imide prepolymer, polyphenylenesulfide resin, aluminium powder, and N-methylpyrrolidone to homogeneity.

By the general procedure of Example 1, an undercoat layer was formed on an iron plate by the use of this undercoat composition. Next, an upper resin layer was formed by powder-coating of polyphenylenesulfide (PPS) resin four times on the undercoat layer at the electrostatic voltage of 60 kV by the procedure of Example 1. The layers were baked for 30 minutes at the temperature of 380° C. and then cooled with water. The resin layer was 500 μm thick, on the average.

The adhesion between the PPS layer and the metal substrate of the coated metal plate obtained was evaluated by the procedures of Example 1. Results of the peeling test showed that the 90° peeling strength was 6 to 7 kg/cm. Moreover, after the hot water test, the resin layer remained in good condition.

COMPARATIVE EXAMPLE 1

An undercoat composition was obtained by the procedure of Example 1 except that 7.5 g of epoxy resin (Epicoat 828) and 2.5 g of 4,4'-diaminodiphenylsulfone was used instead of 10 g of the imide prepolymer. By use of the general procedure of Example 1, an undercoat layer was formed on an iron plate, except that the undercoat layer was pre-cured for 30 minutes at the temperature of 150° C. Next, the resin layer was formed by powder-coating of PFA on the undercoat layer by the procedure of Example 1.

The adhesion between the PFA layer and the metal substrate of the coated metal plate obtained was evaluated by the procedures of Example 1. Results of the peeling test showed that the 90° peeling strength was 1.5 to 2.5 kg/cm. After the hot water test, some of the resin layer was blistered.

COMPARATIVE EXAMPLE 2

An undercoat layer was formed on an iron plate by the procedure of Example 1 except that the imide prepolymer was not used. Next, a resin layer was formed by powder-coating of PFA on the undercoat layer by the procedure of Example 1.

The adhesion between the PFA layer and the metal substrate of the coated metal plate obtained was evaluated by the procedure of Example 1. Results of the peeling test showed that the 90° peeling strength was 0.5 to 0.8 kg/cm. After the hot water test, peeling of the resin layer was observed all over the surface of the plate.

COMPARATIVE EXAMPLE 3

An undercoat layer was formed on an iron plate by the procedure of Example 1 except that PFA was not used. Next, a resin layer was formed by powder-coating of PFA on the undercoat layer by the procedure of Example 1.

The adhesion between the PFA layer and the metal substrate of the resulting coated metal plate was evaluated by the procedure of Example 1. Results of the peeling test showed that the 90° peeling strength was 1.5 to 2.5 kg/cm. After the hot water test, part of the resin layer was blistered.

COMPARATIVE EXAMPLE 4

| | |
|---|---|
| Alcohol solution containing 50% by weight of ethyl silicate condensate | 10 g |
| Aluminium powder (mean particle diameter, 40 μm or less) | 15 g |

An undercoat composition was obtained by mixture of the alcohol solution and the aluminium powder, powder to homogeneity. After the undercoat composition was coated on the clean iron plate with brush according to the procedures of Example 1, the coated surface of the plate was air-dried, baked for 30 minutes at temperature of 150° C., and then baked for 10 minutes at the temperature of 400° C. Next, the resin layer was formed by powder-coating of PPS on the undercoat layer by the procedure of Example 4.

The adhesion between the PFA layer and the metal substrate of the coated metal plate obtained was evaluated by the procedure of Example 1. Results of the peeling test showed that the 90° peeling strength was 3 to 4 kg/cm. After the hot water test, a part of the resin layer was blistered.

As is illustrated in the Examples and the Comparative Examples, the undercoat composition of the present invention has excellent heat-resistance, and excellent adhesiveness to both the upper resin and the metal. Thus, a resin can be powder-coated on the undercoat layer at a high temperature without decomposition of the undercoat composition. Also, the coated metal plate obtained has excellent adhesion between the upper resin layer and the metal substrate. Therefore, the coated metal plate is not blistered after the peeling test or the hot water test.

The metal plates coated by the use of undercoat compositions that lacked the imide prepolymer or the resin had low strength against peeling. The coated layer was peeled and/or blistered after the hot water test. The coated metal plate obtained by the use of the undercoat composition of the prior art containing epoxy resin and 4,4'-diaminodiphenylsulfone had low strength against peeling. The coated metal plate blistered during the hot water test. The coated metal plate obtained by the use of the undercoat composition of the prior art containing ethyl silicate condensate and aluminium powder, which had high strength against peeling, blistered during the hot water test. This is because the adhesiveness beween the undercoat layer and the upper resin layer and between the undercoat layer and the substrate are inferior, and hot water permentes among the layers.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A coated metal substrate, comprising:
a metal substrate;
an upper layer of resin material formed by powder-coating the resin material on the metal substrate; and
an undercoating layer formed by an undercoating composition between the metal substrate and the upper layer;
wherein the undercoating composition comprises:
an undercoating resin material comprised of the resin material of the upper layer;
the undercoating resin material being selected from the group consisting of tetrafluoroethylenehexafluoroprophylene copolymer (FEP), perfluoroalkoxy resin (PFA), polyphenylene-sulfide (PPS), ethylenetetrafluoroethylene copolymer (ETFE), polyetheretherketone (PEEK), polyetherketone (PEK), nylon (NY), polyethersulfone (PES), polysulfone (PSF), polyarylate (PAR) and polyetherimede (PEI); and
an imide prepolymer obtained by the reaction of tetracarboxylic acid, aromatic diamine, and unsaturated acid anhydride wherein the imide prepolymer has the following general structure formula:

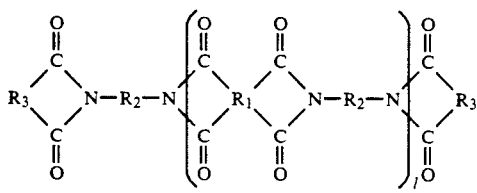

wherein
$R_1$ is an aromatic tetracarboxylic acid residue;
$R_2$ is an aromatic diamine residue;
$R_3$ is an unsaturated acid anhydride residue which does not include an acetyl group; and
$l$ is an integer and the mean value of $l$ is within the range of 0 to 5 and
wherein the ratio of the imide prepolymer to the undercoating resin material is from 10:90 to 90:10 by weight.

2. The coated metal substrate according to claim 1, wherein the imide groups of the prepolymer further include amic acid residues.

3. The coated metal substrate according to claim 1, wherein the tetracarboxylic acid residue is selected from the group consisting of pyromellitic dianhydride, 3,3',4,4'-benzophenone tetracarboxylic acid dianhydride, 2,3,6,7-naphthalene tetracarboxylic dianhydride, 3,3',4,4'-diphenyltetracarboxylic dianhydride, 2,2',3,3'-diphenyltetracarboxylic dianhydride, bis(3,4-dicarboxyphenyl)-ether dianhydride, bis(3,4-dicarboxyphenyl)methane dianhydride, and bis(3,4-dicarboxyphenyl)sulfone dianhydride.

4. The coated metal substrate according to claim 1, wherein the aromatic diamine is selected from the group consisting of paraphenylenediamine, metaphenylenediamine, 3,3'-diaminodiphenylmethane (i.e., 3,3'-methylenedianiline), 3,3'-oxydianiline, 4,4'-diaminodiphenylmethane, 3,3'-diaminodiphenylsulfide, 4,4'-diaminodiphenylsulfide, 3,3'-diaminodiphenylsulfone, 4,4'-diaminodiphenylsulfone, 3,3'-diaminodiphenylether, 4,4'-diaminodiphenylether, 1,5-diaminonaphthalene, 2,6-diaminonaphthalene, n-xylenediamine, n-tolylenediamine, tolidine base, n-aminobenzylamine, p-aminobenzylamine, 1,3-bis(3-aminophenoxy)benzene, 1,4-bis(4-aminophenoxy)-benzene, 2,2'-bis(4-aminophenoxyphenyl)-propane, 4,4'-bis(4-aminophenoxy)-diphenyl.

5. The coated metal substrate according to claim 1, wherein the unsaturated acid anhydride is selected from the group consisting of 3,6-endomethylene-1,2,3,6-tetrahydrophthalic anhydride, cis-4-cyclohexene-1,2-dicarboxylic anhydride, maleic anhydride, the alkyl substituents thereof, and the halogen substituents thereof.

6. The coated metal substrate according to claim 1, wherein the undercoating layer is formed by the steps of coating the undercoating composition on the metal substrate, and heating the coated undercoating composition.

7. The coated metal substrate according to claim 1, wherein the undercoat composition further comprises an inorganic filler.

8. The coated metal substrate according to claim 7 wherein the inorganic filler is selected from the group consisting of metals, metal oxides, glass, carbon, and ceramics.

9. The coated metal substrate according to claim 7, wherein the weight ratio of the resin to the inorganic filler is in the range of from about 80:20 to about 20:80 parts by weight.

10. The coated metal substrate as claimed in claim 9, wherein the inorganic filler is a metal selected from the group consisting of aluminum, zinc, nickel alloy, stainless steel, and iron alloy.

11. The coated metal substrate according to claim 9, wherein the inorganic filler is a metal oxide selected from the group consisting of $Al_2O_3$, $Fe_2O_3$, $TiO_2$, $ZrO_2$, $Cr_2O_3$, NiO.

12. The coated metal substrate according to claim 9, wherein the inorganic filler is a ceramic selected from the group consisting of silicon nitride and titanium nitride.

* * * * *